June 12, 1934.　　　A. McL. NICOLSON　　　1,962,609
DIATHERMIC OSCILLATOR SYSTEM
Filed Nov. 15, 1930　　　2 Sheets-Sheet 1
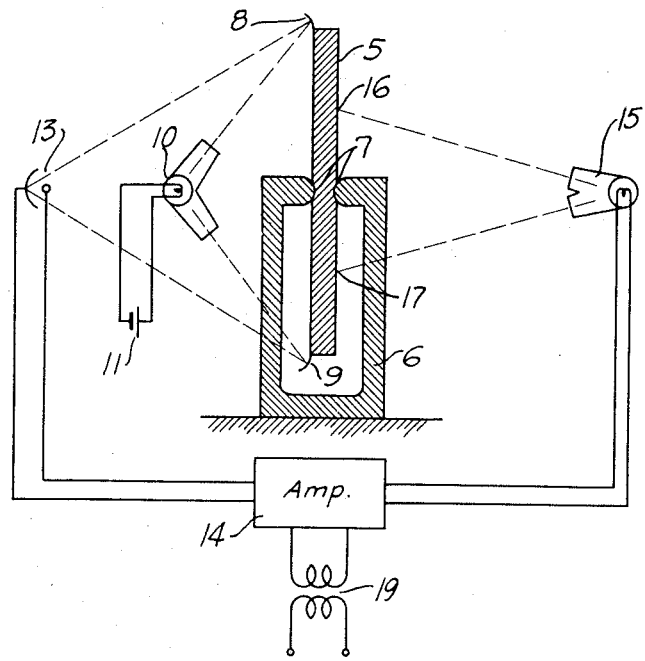
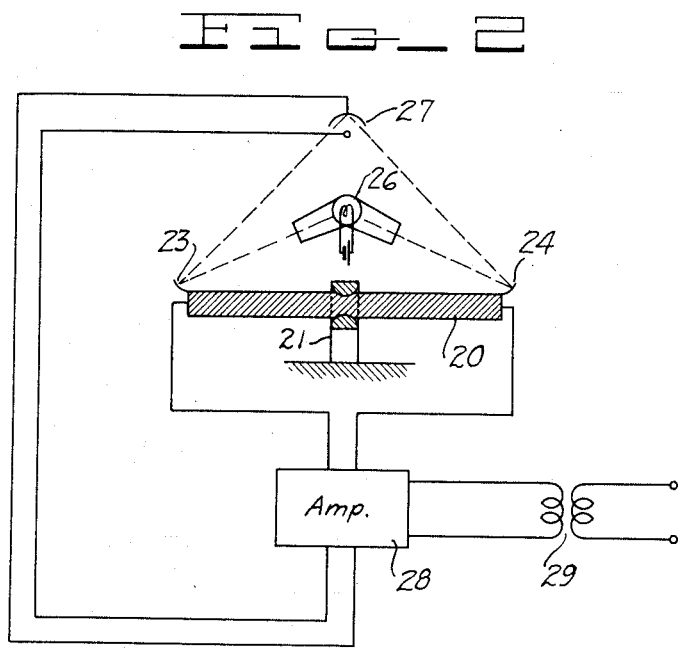
INVENTOR
*Alexander McLean Nicolson.*
BY
ATTORNEY

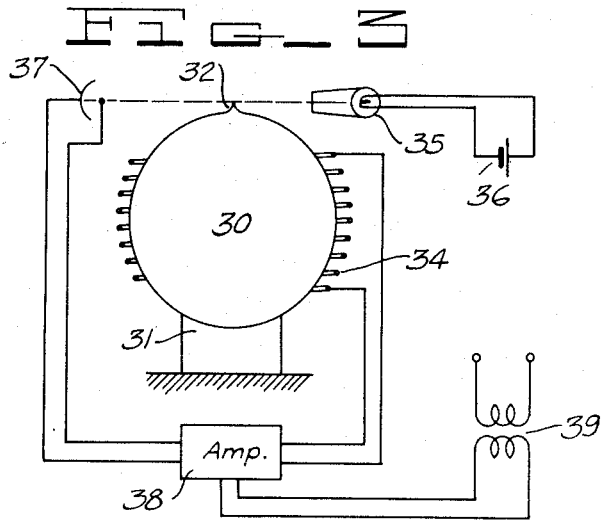
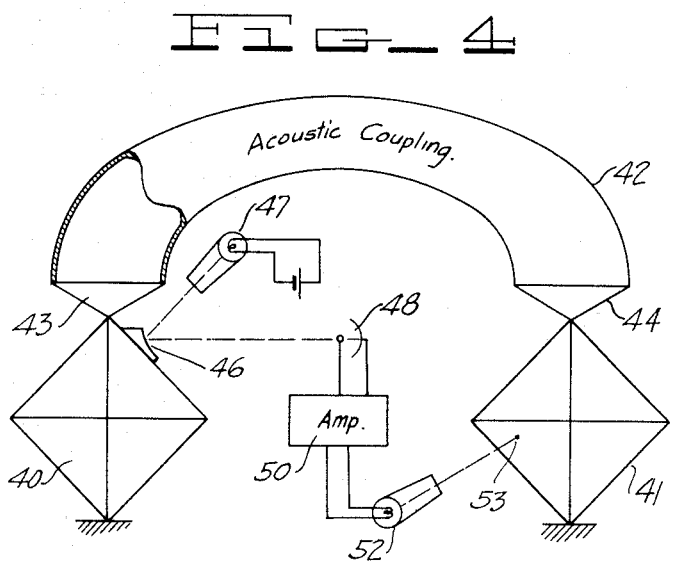
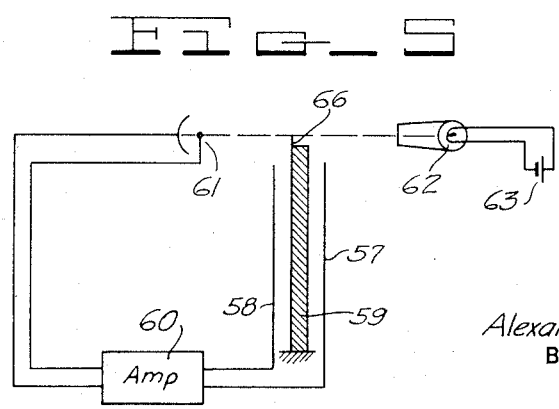

Patented June 12, 1934

1,962,609

UNITED STATES PATENT OFFICE 1,962,609

DIATHERMIC OSCILLATOR SYSTEM

Alexander McLean Nicolson, New York, N. Y., assignor to Communication Patents, Inc., New York, N. Y., a corporation of Delaware Application November 15, 1930, Serial No. 495,839

11 Claims. (Cl. 250—36)

This invention relates to the generation of oscillations, and particularly to the generation of electrical oscillations employing the natural elastic resonance of certain mediums.

An object of the invention is to generate oscillations.

Another object of the inventon is to generate electrical oscillations by diathermic radiation.

A further object of the invention is to produce electrical oscillations controlled by the natural elastic resonance of a medium which varies its dimensions with temperature changes.

It has been found that certain homogeneous materials such as copper, glass and crystals have the property of changing their dimensions in accordance with temperature variations. By varying the temperature of the above mentioned materials, expansion and contraction occurs, the amount thereof depending upon the dimensions and shape of the material. This expansion and contraction occurs at a certain frequency which is also dependent upon the dimensions and shape of the medium and further on the coefficient of expansion of the medium. The temperature of the medium may be varied by the application of heat of conduction, convection or radiation, the latter taking the form of visible or invisible light waves. The application of the heat to certain points on the medium, such as the thermal polar points of vibrations, has been found to be more effective than if projected thereon at random. For instance, a small change in applied heat at certain regions of the medium produces a sufficient physical change in the medium to deflect light projected thereon. This deflection is employed to actuate a photocell and create electrical oscillations. This action is extremely rapid, obtaining a frequency far above the audible range.

The invention is based upon the contraction and expansion or oscillation of a medium through variations of applied heat. The variations in heat are caused by the generation of electric current in a photoelectric cell which in turn is actuated by the oscillation of a medium.

The apparatus, in brief, consists of a source of heat radiations which may be invisible such as infra red or ultra violet or visible light rays. The diathermic medium may be supported at a thermal polar point with the heat waves being applied or projected at another such point on the medium. The medium has at its extremity or extremities reflecting surfaces upon which light is projected and reflected therefrom to a photoelectric cell. Any change in reflection of light causes a generation of variable currents in the cell which are impressed upon an amplifier which in turn varies the source of heat rays. The period of oscillation generated is dependent upon the constants of the diathermic medium employed, its shape and dimensions.

Other embodiments of the invention are disclosed herein in which the medium is gaseous and is contracted or expanded by heat obtained by the passage of electric current in close proximity thereto.

Further modifications are also described and the invention will be more fully understood by reference to the following description in conjunction with the accompanying drawings, in which:

Figure 1 shows one embodiment of the invention in which heat is projected at the thermopoles of the medium.

Fig. 2 is an embodiment in which heat is applied directly through the medium in the form of a trevellyan rocker.

Fig. 3 is a gaseous type of diathermic oscillator.

Fig. 4 is an embodiment in which part of the coupling is an acoustic path; and

Fig. 5 is the form in which heat variations are applied electrostatically.

Referring now particularly to Fig. 1, a medium 5 of glass, steel, or the like, is mounted in the center by a U-shaped support 6. The medium may have slight depressions 7 at its midsection for the insertion of the arms of the U-shaped bracket support. At the extreme ends of the medium, reflecting elements 8 and 9 may be glued or otherwise fastened in a position to reflect light from a source 10. The source 10 is energized from a supply 11. The reflecting mediums 8 and 9 may also be formed from a part of the surface of the medium 5 which has been formed at the proper angle with reference to the source of light 10 and the angle of reflection. Light from the source 10 after deflection impinges upon a photoelectric cell 13 feeding an amplifier 14 of any type well known in the art. The output of the amplifier 14 is connected to a heat source 15 in the form of light waves, the light being projected to two preferably thermopoles 16 and 17 of the medium 5. The light source 15 may provide infra red or ultra violet light waves which are invisible, or it may contain the frequencies within the visible range in combination with the former.

The system is operated by energizing the amplifier 14 and the light source 10. As the light source 10 increases in intensity, there will be an increase of light on the cell 13, the result of which may be an increase in the heat projected from the source 15. The system may also operate so that an increase in illumination on the cell 13 diminishes the heat on the medium, in case of a medium with a negative temperature coefficient. Upon the rise in temperature of the medium 5, a tilting or elongation of the reflecting elements will be accomplished which will decrease the light on the cell 13. This decrease will present itself at source 15 as a similar decrease in heat projection lowering the temperature of the medium 5, and allowing it to return to a position above that of normal. A continuation of these alternations in applied heat will produce oscillations within the circuit which may be utilized in the output circuit 19.

In Fig. 2 a horizontal mounting of a medium 20 is accomplished by a similar U-shaped bracket 21 supporting the medium at its median point. This medium has reflecting surfaces 23 and 24 which may be attached to the medium 20 or formed of a polished element thereof. A light source 26 provides light for operating a photoelectric cell 27 after being reflected from the elements 23 and 24. The photoelectric cell is connected to an amplifier 28 similar to that used in the system of Fig. 1, which has in series with its output circuit the medium 20. Variations of output energy will cause through $I^2R$ loss corresponding variations in the temperature of the medium 20 which will oscillate and displace reflecting surfaces 23 and 24, causing varying light intensities on the cell 27. This regeneration through the circuit creates electrical oscillations which may be utilized with an output circuit 29.

The embodiment of the oscillator shown in Fig. 3 comprises a container 30 which is filled with a gas such as argon, chlorine or the like of low specific heat. This container is mounted upon a base 31 and is drawn to a sharp point 32 at a position diametrically opposite the fixed support. A heater coil system 34 is shown surrounding the container 30 for heating the gas within. Of course the container should be, preferably, made of thin glass or metal which is flexible, while the contents may also be fluid as well as gaseous. The density of the material used and its temperature coefficient will determine the frequency at which the system will operate. This oscillator system has a source of constant illumination 35 supplied from a source 36 which is projected to a photoelectric cell 37, the photoelectric cell being connected to an amplifier 38. An output circuit 39 is shown to which may be connected any work circuit for the oscillator.

This system operates by energizing the amplifier 38 and the source of constant illumination 35. As the gas within the container 30 is heated it expands moving the point 32 to cut off the light from the photoelectric cell 37. The cutting off of the light diminishes the energy to the coils 34, allows the gas to return to normal, and again energizes the cell 37. These consecutive actions provide electrical oscillations in the output circuit 39.

In Fig. 4 crystals 40 and 41 are mounted at one corner thereof and have on their opposite corners, respectively, an audio frequency collecting diaphragm 43 and an audio frequency projecting diaphragm 44. The diaphragms may be connected by an acoustic housing 42 through which audio waves may be transmitted from diaphragm 44 to diaphragm 43. The crystal 40 also has a reflecting surface 46 which reflects light from a source 47 of constant illumination to a photoelectric cell 48. The photoelectric cell feeds an amplifier 50 which in turn feeds a heat projecting source 52. The heat projecting source 52 is projected upon the point 53 of the crystal 41, the crystal dilating or contracting in accordance with the intensity of the source 52. In this system, light from the source 47 impinging on the cell 48 varies in accordance with the physical variations in the crystal 40 which are produced by the audible sound wave impinging on the diaphragm 43. The varying light intensity produces varying currents in the cell 48 which, after amplification by the amplifier 50, energizes source 52 correspondingly, and again creates the audible sounds by causing the crystal 41 to contract and expand in accordance therewith. The diaphragm 44 projects the audible sound through the acoustic coupling 42 to the diaphragm 43 and the cycle is again repeated.

In Fig. 5 a pair of electrostatic electrodes 57 and 58 are shown on the sides of a crystal or homogeneous element 59 of the type shown in Figs. 1 and 2. The electrostatic plates are energized from an amplifier 60 which receives its control variations from a photoelectric cell 61. A constant source of light radiations is shown at 62, this source being energized from an energy supply 63. The element 59 has at its extremity a gate element 66 which operates to increase or decrease the light upon the cell 61 being projected from the source 62. The gate operates by oscillations of the element 59 which are caused by the varying heat supplied thereto from electrodes 57 and 58. In other words, in this oscillating system the heat supplied to the element is through electrostatic means instead of directly or through the projection of heat rays thereon.

In all of the above systems the diathermic effect is employed to produce the oscillations, that is, through the production of oscillations in the medium caused by variations in applied heat, oscillations are produced at a frequency determinable by the dimensions, shape and by the temperature or diathermic constant of the medium employed.

Although in the above system only a few materials have been disclosed, it will be understood that there are other materials which may be employed in oscillating systems of this type, the materials and systems of which are considered to be within the scope of the appended claims.

What is claimed is:

1. An oscillator comprising a frequency determining medium varying in dimensions in accordance with temperature changes, means for applying heat to said medium, and means for causing said dimension changes in said medium to continuously vary the application of heat to said medium.

2. In an electrical oscillator, a frequency determining medium oscillating in accordance with continuous variations in temperature, said temperature variations directly producing said oscillations, means for creating said continuously varying temperatures, and means operated by the oscillation of said medium for controlling said temperature varying means.

3. In an electrical oscillator system, a frequency determining medium capable of varying its dimensions with temperature, means for projecting heat on said medium in the form of continuously varying radiated waves, an electrical amplifier and means for causing said change of dimensions to control said amplifier, said amplifier being connected to said projecting means.

4. In an electrical oscillating system, a medium adapted to vary its dimensions with temperature changes, means for applying heat to said medium in the form of electrical currents, means for controlling said electrical currents, said means including a photoelectric cell, and means to control said cell, said means including means for reflecting light of constant intensity from said medium.

5. In an electrical oscillator system, a gaseous frequency determining medium adapted to vary its dimensions with temperature changes, a container for said medium, said container being flexible, means for applying heat to said gas from electrical currents, and means for controlling the value of said electrical currents by the variation in form of said container.

6. In an electrical oscillator system, a gas, a container varying in dimensions with temperature changes of said gas, means for expanding and contracting said gas with electrical currents, and means for varying said electrical currents by said expansion and contraction.

7. In an electrical oscillating system, a frequency determining medium adapted to vary its dimensions with temperature, electrodes placed on opposite sides of said medium, means for applying a potential to said electrodes, and means controlled by the variation in dimensions of said medium to continuously vary the potential on said electrodes.

8. In an electrical oscillating system, a frequency determining medium adapted to vary its dimensions with temperature, means for passing electric current through said medium to vary its dimensions, and means controlled by the variations in dimensions of said medium to continuously vary the amount of current through said medium.

9. The method of producing oscillations determined by a medium which contracts and expands with temperature comprising expanding and contracting said medium by continuously varying the application of heat thereto, and controlling the application of heat by the expansion and contraction of said medium.

10. The method of creating electrical variations determined by a medium which contracts and expands with temperature comprising projecting heat rays upon said medium to cause a continuous variation in the dimensions thereof, and controlling the projection of said heat rays by a continuous change in dimensions of said medium.

11. In an oscillator system, a photoelectric cell, a source of light for actuating said cell, a medium adapted to change its dimensions with temperature, means controlled by said change in dimensions for varying the energization of said photoelectric cell from said source of light, an amplifier connected to said cell and controlled thereby, a source of heat for said medium, and means for continuously applying the output of said amplifier for controlling the heat applied to said medium.

ALEXANDER McLEAN NICOLSON.